(12) United States Patent
Lin et al.

(10) Patent No.: US 7,793,024 B2
(45) Date of Patent: Sep. 7, 2010

(54) METHOD FOR UTILIZING A PCI-EXPRESS BUS TO COMMUNICATE BETWEEN SYSTEM CHIPS

(75) Inventors: Chang-Guang Lin, Taipei (TW); Chung-Hong Lai, Taipei (TW); You-Cheng Luo, Taipei (TW)

(73) Assignee: NVIDIA Corporation, Santa Clara, CA (US)

( * ) Notice: Subject to any disclaimer, the term of this patent is extended or adjusted under 35 U.S.C. 154(b) by 938 days.

(21) Appl. No.: 11/455,858

(22) Filed: Jun. 20, 2006

(65) Prior Publication Data

US 2007/0293984 A1 Dec. 20, 2007

(51) Int. Cl.
 *G06F 13/00* (2006.01)
(52) U.S. Cl. ............................ 710/260; 710/48; 710/313
(58) Field of Classification Search ......... 710/260–269, 710/48, 49, 306, 313
See application file for complete search history.

(56) References Cited

U.S. PATENT DOCUMENTS

| | | | | |
|---|---|---|---|---|
| 7,506,087 | B2 * | 3/2009 | Ho et al. ...................... | 710/104 |
| 2005/0033895 | A1 * | 2/2005 | Lueck et al. ................. | 710/311 |
| 2005/0144346 | A1 * | 6/2005 | Barth et al. .................. | 710/260 |
| 2005/0289271 | A1 * | 12/2005 | Martinez et al. ............. | 710/260 |
| 2006/0161707 | A1 * | 7/2006 | Davies et al. ................ | 710/268 |
| 2006/0190663 | A1 * | 8/2006 | Lu ............................... | 710/312 |
| 2007/0055807 | A1 * | 3/2007 | Asaro et al. .................. | 710/315 |
| 2007/0055808 | A1 * | 3/2007 | Asaro ........................... | 710/315 |
| 2007/0067534 | A1 * | 3/2007 | Butler et al. ................. | 710/260 |

OTHER PUBLICATIONS

Budruk, Ravi; Anderson, Don; Shanley, Tom; PCI Express System Architecture; Chapter 9; MindShare, Inc.; 2004.*

* cited by examiner

*Primary Examiner*—Glenn A Auve
(74) *Attorney, Agent, or Firm*—Patterson & Sheridan, LLP (57) ABSTRACT

A method for command transmission between systems is introduced. The command transmission between the systems, such as a north bridge chip, a south bridge chip and a central processing unit (CPU), employs the signals transmission specified by a PCI Express bus originally for the communication between system chips or peripheral devices. The signals transmission includes an interrupt or a system management instruction specified by the PCI Express bus, which further defines the specific addresses of a memory packet and a system message packet. In the preferred embodiment, the method thereof comprises the steps of transmitting an INTA command first, then a second system chip upstreams an INTR/system-management command to a first system chip. After that, the first system chip downstreams an EOI/system-management command to the second system chip.

13 Claims, 10 Drawing Sheets

METHOD FOR UTILIZING A PCI-EXPRESS BUS TO COMMUNICATE BETWEEN SYSTEM CHIPS

BACKGROUND OF THE INVENTION

1. Field of the Invention

A method for command transmission between systems is disclosed, and more particularly a command transmission between system chips employing a PCI express bus that defines a certain address for transmitting an interrupt or related system management commands.

2. Description of Related Art

The PCI (Peripheral Component Interconnect) local bus interface was introduced by Intel in June of 1992. PCI is an open architecture standard designed to eliminate PC performance bottlenecks by providing a high performance, processor independent data path between the CPU and peripheral devices. Especially in a 32-bit operation computer bus, the transmission speed can reach 133 MB/sec by 33 MHz processing rate, or 266 MB/sec by 66 MHz processing rate.

The next generation of I/O interconnect called PCI Express (briefed as PCI-E) was introduced to enhance transmission speed as a PCI bus meets bandwidth bottlenecks. The PCI Express bus will probably become the standard I/O bus for every operating platform in the future. The lowest transmission speed of a PCI-Express, such as a PCI-E×1, is at least 250 MB/sec rate in single direction and 500 MB/sec rate in bi-direction. Meanwhile the PCI-E×16 reaches 4 GB/sec in single direction or 8 GB/sec in bi-direction transmission rate and the PCI-E×32 can reach 16 GB/sec rate.

The specifications and the related software for the PCI Express bus should involve the attributes of the previous PCI bus. The system bus used for the central processing unit (CPU) of the computer system enhances the working frequency and voltage thereof. Moreover, the bandwidth of the transmission of the memory also steps up, and the transmission bus between system chips, such as the south bridge and the north bridge, are advanced accordingly.

A conventional PCI and the new generation of PCI Express buses are used for the transmission bus among system chips and peripheral devices. The signals under transmission includes at least a memory message, an input/output (I/O) system message, a configuration message, a vendor defined message and the like.

For enhancing the bus rate of transmission of a computer system, the present invention applies the PCI Express bus, which is originally used for the transmission among system chips and peripherals, to the data transmission between system chips or between a CPU and system chips. Therefore, the packet format transmitted under the PCI Express standard should be changed so as to exactly transmit and receive a system management, an interrupt signal or the like among system chips via the PCI Express bus. Since the PCI Express bus extends the conventional structure of the PCI, the preferred embodiment of the present invention can be used to reduce the cost of developing a new transmission interface, and break through the bottleneck of conventional transmission bandwidth.

SUMMARY OF THE INVENTION

A method for command transmission between systems, is applied to a PCI Express bus to data transmission between system chips, such as a south bridge chip or a north bridge chip, and to a system chip and a CPU. Therefore, a certain memory address is defined in a memory packet or in a system message packet so as to transmit commands between the systems, such as an interrupt command or the like, or a system management command therebetween. The method for command transmission between systems, which transfers a plurality of commands between system chips through an address defined in a packet carried by the PCI Express bus within a computer system, comprises: a) transmitting an INTA command; then b) upstreaming an INTR/system-management command, which is transmitted from a second system chip to a first system chip; and c) downstreaming an EOI/system-management command, which is transmitted from the first system chip to the second system chip.

A memory packet is incorporated in the preferred embodiment for transmitting a plurality of commands between system chips. The steps for transmitting the INTR/system-management in the memory packet comprises the step of requesting to operate an interrupt process by a driving program of a peripheral device to begin the process. The CPU transmits an INTA command, and the first system chip receives the INTA command and transfers the INTA command to a memory-read command and saves the memory-read command to a defined INTA-memory address. Next, the second system chip receives the memory-read command and responds with a completion of memory-read command. After that, the first system chip receives the completion of memory-read command and transfers the completion of memory-read command to an INTA-completion command.

The steps for upstreaming the INTR/system-management command in a memory packet comprises the step of transmitting a memory-write command to an INTR/system-management-memory address defined in the memory packet by the second system chip. Next, the first system chip receives the memory-write command of the INTR/system-management-memory address, and transfers the memory-write command to a sideband signal of the INTR/system management by the first system chip.

The steps for downstreaming the EOI/system-management command of a memory packet comprises: the CPU transmits the EOI/system-management command to begin the process. The first system chip transfers the EOI/system-management command to the memory-write command and saves a defined EOI/system-management-memory address in the memory packet. After that, the second system chip receives the memory-write command via the second system chip and a driving program is used to process the EOI/system-management command.

A system message packet is incorporated in another preferred embodiment, wherein the steps for transmitting the INTA command in the system message packet comprises the step of the CPU requesting to operate an interrupt process, and transmitting the INTA command via the central processing unit. Then the first system chip receives the INTA command and transfers the INTA command to an INTA message defined in the system message packet. After that, the second system chip receives the defined INTA message, and responds with a defined INTA-completion message. Next, the first system chip receives the defined INTA-completion message, and transfers the defined INTA-completion message to an INTA-completion command.

The steps for upstreaming the INTR/system-management command in a system message packet comprises the second system chip transmitting a defined INTR/system-management command in a certain address of the system message packet to begin the process. Next, the first system chip receives the defined INTR/system-management command, and transfers the defined INTR/system-management command to a sideband signal of the INTR/system management.

Afterward, the steps for downstreaming the EOI/system-management command of the preferred embodiment of the present invention comprises the first system chip transmitting the EOI/system-management command in a certain address of the system message packet first, and transferring the EOI/system-management command to an EOI/system-management message in a certain address of the system message packet. Next, the second system chip receives the defined EOI/system-management message via the second system chip. Finally a driving program of a peripheral device processes the EOI/system-management command.

BRIEF DESCRIPTION OF DRAWINGS

The present invention will be readily understood by the following detailed description in conjunction accompanying drawings, in which.

DETAILED DESCRIPTION OF THE PREFERRED EMBODIMENTS

To allow the Examiner to understand the technology, means and functions adopted in the present invention further, reference is made to the following detailed description and attached drawings. The Examiner shall readily understand the invention deeply and concretely from the purpose, characteristics and specification of the present invention. Nevertheless, the present invention is not limited to the attached drawings and embodiments in following description.

A method for command transmission between system chips is disclosed. Originally, a PCI Express bus was used for signal transmission between system chips and peripherals, but not for transmission between system chips. For data transmission using a PCI Express bus between system chips in the preferred embodiment of the present invention, the packet format transmitted under the PCI Express standard should be changed so as to transmit the packets, such as a system management, an interrupt, or the like, to the system chip accurately. The PCI Express standard is likewise used to receive packets from system chips.

Because the current used packet format of the PCI Express standard merely defines the packets including memory, I/O, configuration and message, it does not define the packets as system management and interrupt commands. In other words, the PCI Express bus used for the transmission of the present invention defines a new format therefor. After that, the signals, such as system management, interrupt or the like, can be transmitted or received between system chips correctly.

Figure 1:
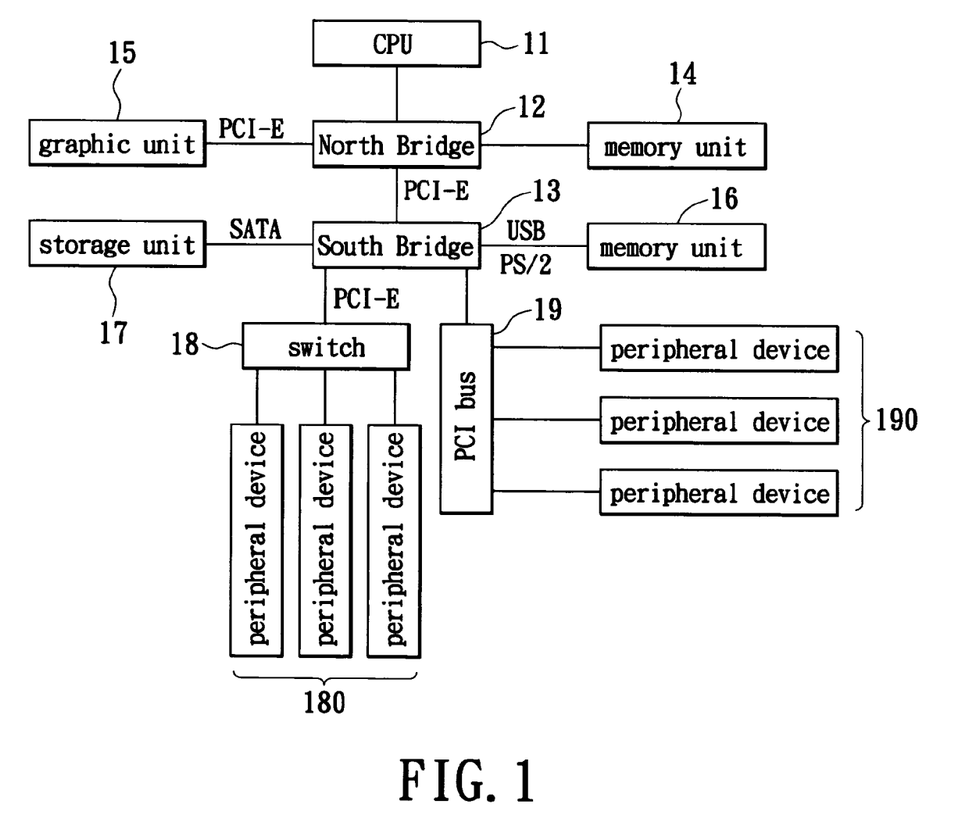
FIG. 1 is a schematic diagram illustrating a computer system with a PCI Express structure.

Reference is made to FIG. 1, which shows a computer system having a hybrid structure of the PCI Express bus and a conventional PCI bus in a preferred embodiment. Alternatively, another embodiment can be a computer system only having a conventional PCI bus. The conventional computer system comprises a North Bridge chip 12 coupled to a central processing unit (CPU) 11, where the North Bridge chip 12 couples with a memory unit 14 of the system memory and a graphic unit 15 for processing graphic displays. Alternatively, the system memory from another computer system, such as a K8 frame of AMD Inc., couples to the CPU 11. A South Bridge chip 13 coupled with the peripheral devices and I/O system couples with the North Bridge chip 12 and the peripheral devices 16, such as a keyboard and a mouse, via a USB or PS/2 interface. Furthermore, the South Bridge chip 13 couples with a storage unit 17 such as a hard drive or a CD drive via a Serial ATA (SATA) interface.

The hybrid structure of the PCI bus and the PCI Express bus of the preferred embodiment is shown in FIG. 1. The South Bridge chip 13 couples to a plurality of peripheral devices 190 employing the PCI bus, or to a plurality of peripheral devices 180 with the PCI Express bus. Moreover, the PCI Express bus is a structure with a parallel bus topology, which further includes a host bridge (not shown in diagram) and a multiple I/O connection. The mentioned structure of multiple point-to-point connection introduces a switch 18 shown in FIG. 1 to the system I/O topology as a substitute for the conventional PCI bus with a multiple endpoint downloading structure.

For fully advancing the efficiency of the structure of the present invention, high-speed transmission via the PCI Express bus between system chips and the peripheral devices is introduced in the preferred embodiment. Namely, the PCI Express bus is introduced to the command transmission between the North Bridge chip and the South Bridge chip, or as the interface between the CPU and the South/North Bridge chip. The PCI Express bus can be used for signal transmission between other system chips without any further development of other buses for future needs. Nevertheless, the message transmitted with the PCI Express format does not completely meet the requirements of transmission between system chips. Therefore, the present invention provides a method for command transmission between systems as follows.

Figure 2A:
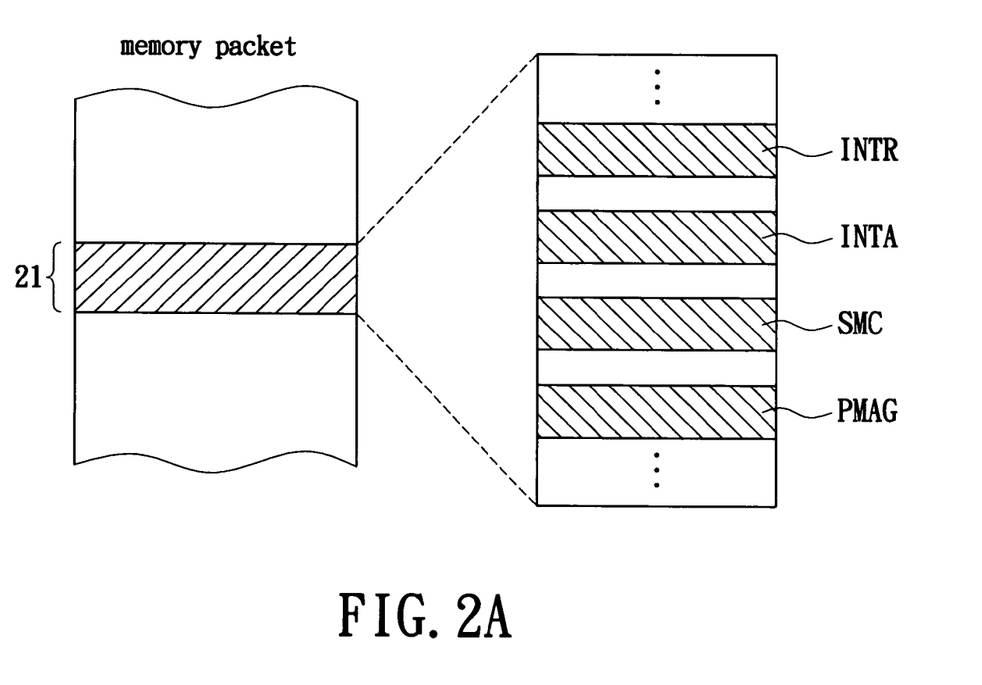
FIG. 2A is a schematic diagram of the message in a memory packet of the present invention.

A set of an addressable address, which is given according to a PCI Express memory packet format, is utilized in one preferred embodiment. The given address is used to recognize the difference between the packets having a system management, an interrupt, or the like, and other packets. The message transmitted in the format of the PCI Express bus at least comprises a memory, an input/output, a configuration and a vendor-defined message (or said system message). In order to coincide with the signal transmission protocol between system chips, a first address 21 is defined in the memory packet shown in FIG. 2A. The content within the memory packet needs to be re-defined, for example, a system interrupt message (INTR), an interrupt acknowledge (INTA), a system management command (SMC), a power management command (PMAG) and the like are added in the first address 21 given in the memory packet.

Figure 2B:
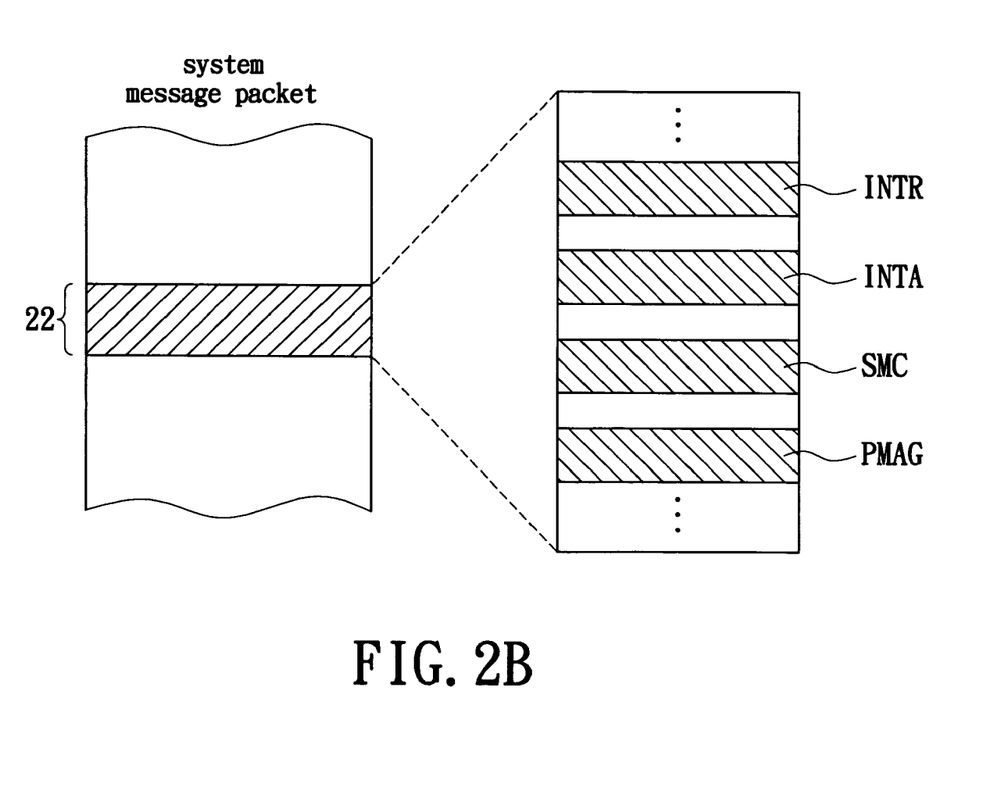
FIG. 2B is a schematic diagram of the message in a system message packet of the present invention.

A system message packet of the PCI Express standard of another preferred embodiment of the present invention is also used to define a packet, such as a system management, interrupt and the like, for distinguishing the difference between other packets. Reference is made to FIG. 2B, a second address 22 given in the system message packet re-defines the content within the packet. Similarly, a system interrupt message (INTR), an interrupt acknowledge (INTA), a system management command (SMC), a power management command (PMAG) and the like are added in the second address 22 given in the system message packet.

Figure 3:
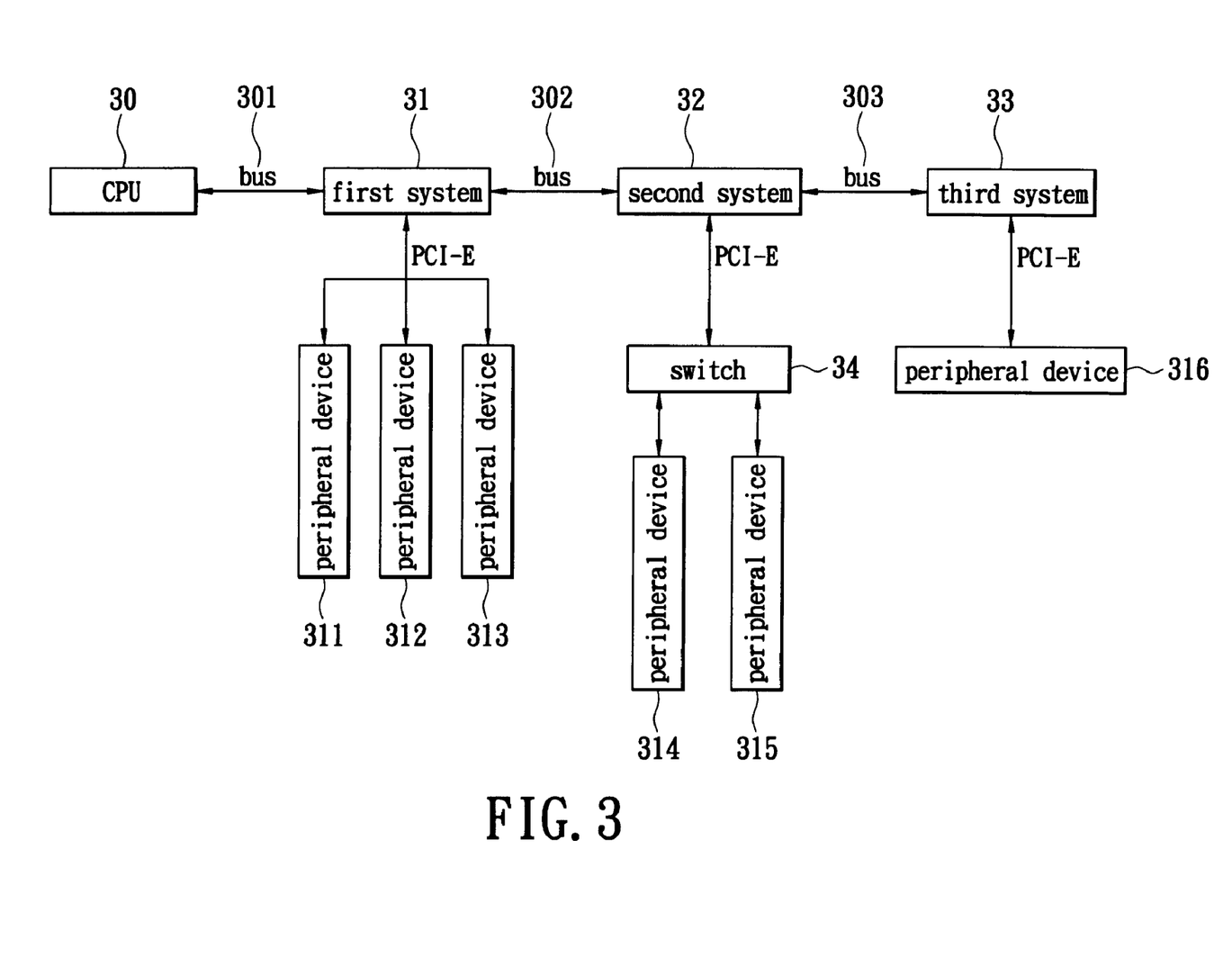
FIG. 3 shows a frame depicting the command transmission of the present invention.

FIG. 3 shows a schematic diagram of the structure for command transmission of the present invention. Similar to the computer system shown in FIG. 1, the structure of the present embodiment can be the frame of a CPU and South/North Bridge chips. Wherein a CPU 30 couples to each system unit individually. Accordingly the CPU 30 couples to a first system 31 via a bus 301, further couples to a second system 32 via a bus 302 and further couples to a third system 33 via a bus 303. Moreover, each mentioned system 31, 32, 33 couples to a plurality of peripheral devices 311 to 316 via a PCI Express bus, or to the peripheral devices 314, 315 through a switch 34. Namely, the aforementioned PCI Express bus is applied to the transmission bus 301, 302, 303 between the systems. Since the PCI Express bus mentioned in the preferred embodiment of the present invention is the main use for command transmission including the conventional PCI bus, it can be used to reduce costs for developing a new transmission interface, and simultaneously break through the bottleneck of conventional transmission bandwidth.

Figure 4:
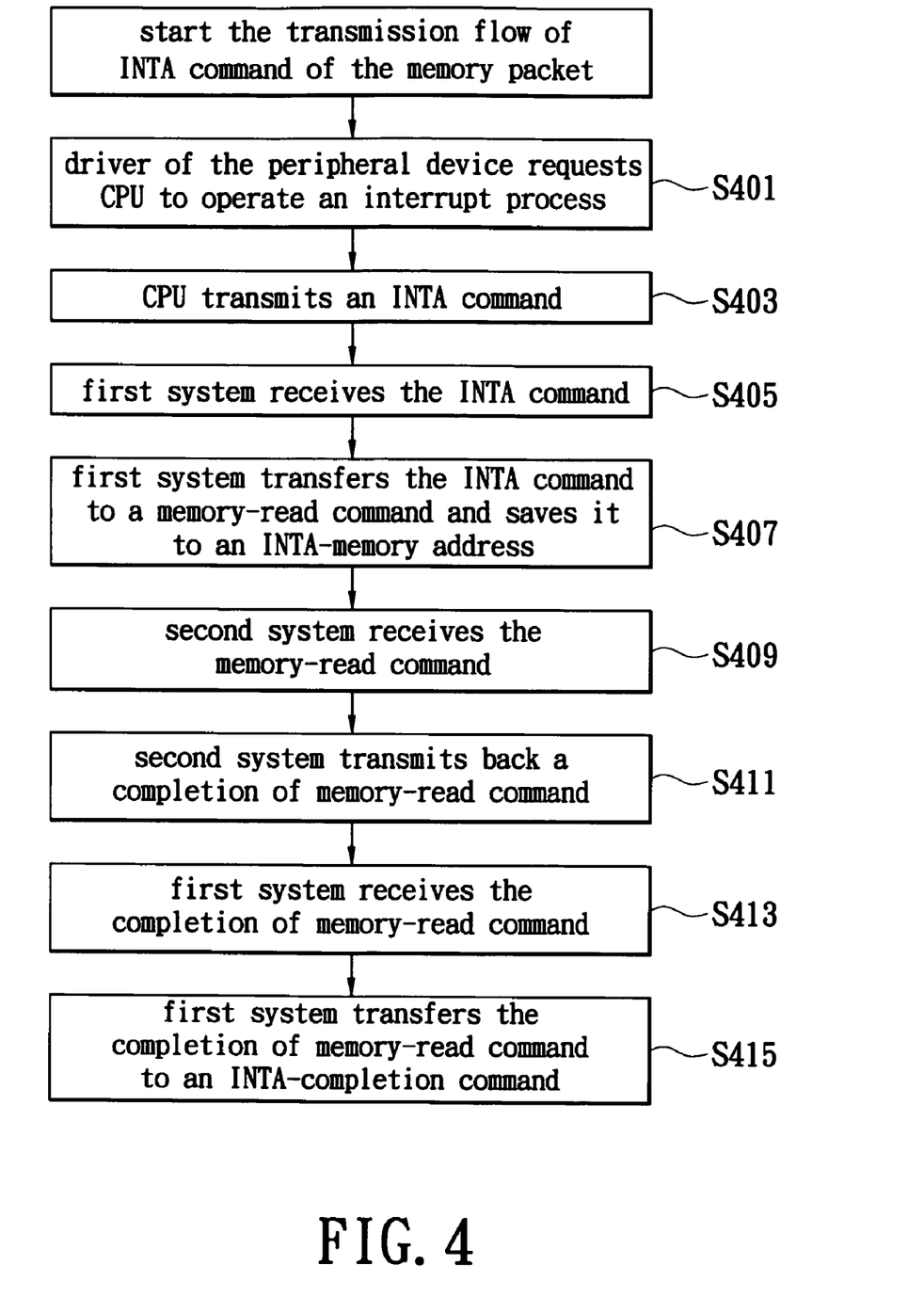
FIG. 4 is a flowchart for transmitting an INTR/system-management command in a memory packet of the present invention.

FIG. 4 is a flowchart for transmitting an INTA command in the memory packet of the preferred embodiment.

The method transfers a plurality of commands between system chips through an address defined in the memory packet carried via the PCI Express bus within the computer system. In the beginning, a driving program of a peripheral device requests the CPU to operate an interrupt process (step S401). Next, the CPU transmits an INTA (Interrupt Acknowledge) command to a first system chip, especially to the North Bridge chip (step S403).

Afterward, the first system chip receives the INTA command from the CPU (step S405), and the first system chip transfers the INTA command to a memory-read command. The memory-read command is then saved to a defined INTA-memory address of the memory packet (step S407).

Next, a second system chip, such as a South Bridge chip, receives the memory-read command (step S409) and further responds to a completion of memory-read command to the first system chip (step S411).

After that, the first system chip receives the completion of memory-read command (step S413), and consequently transfers the completion of memory-read command to an INTA-completion command (step S415).

Figure 5:
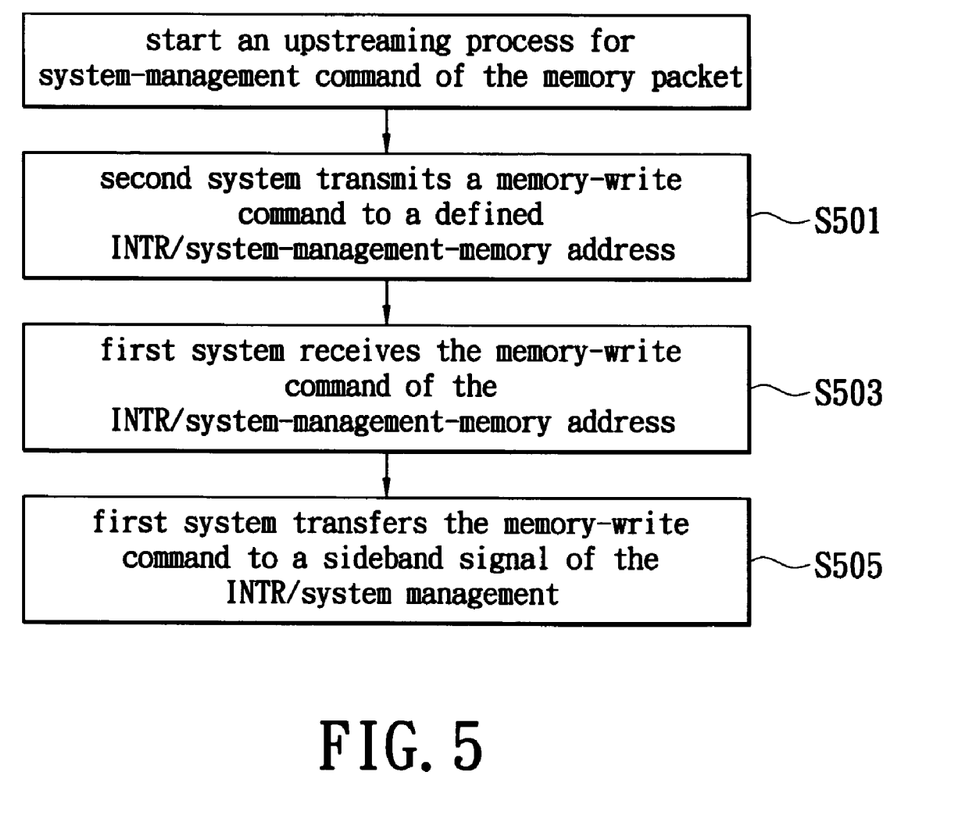
FIG. 5 is a flowchart for upstreaming an INTR/system-management command in a memory packet of the present invention.

The above process transfers the INTA command to the memory-read command. After the above-mentioned transmission of the INTA command, the step goes to the flowchart shown in FIG. 5 illustrating a process of upstreaming an INTR/system-management command transmitted from the second system chip to the first system chip.

To begin the process for transmitting the system-management command, the second system chip, such as a South Bridge chip, transmits a memory-write command to an INTR/system-management-memory address defined in the memory packet (step S501). Then the first system chip, such as the North Bridge chip, receives the memory-write command of the INTR/system-management-memory address (step S503), and transfers the memory-write command to a sideband signal of the INTR/system management (step S505).

While a typical 64-bit PCI Express bus includes 64 addresses/data wires and about 33 sideband signals within 127 signal pins, the adoptive address wires are different from other signals when the sideband signals are utilized. Other commands can proceed with their own procedures without any influence, thereby reducing idle time.

Figure 6:
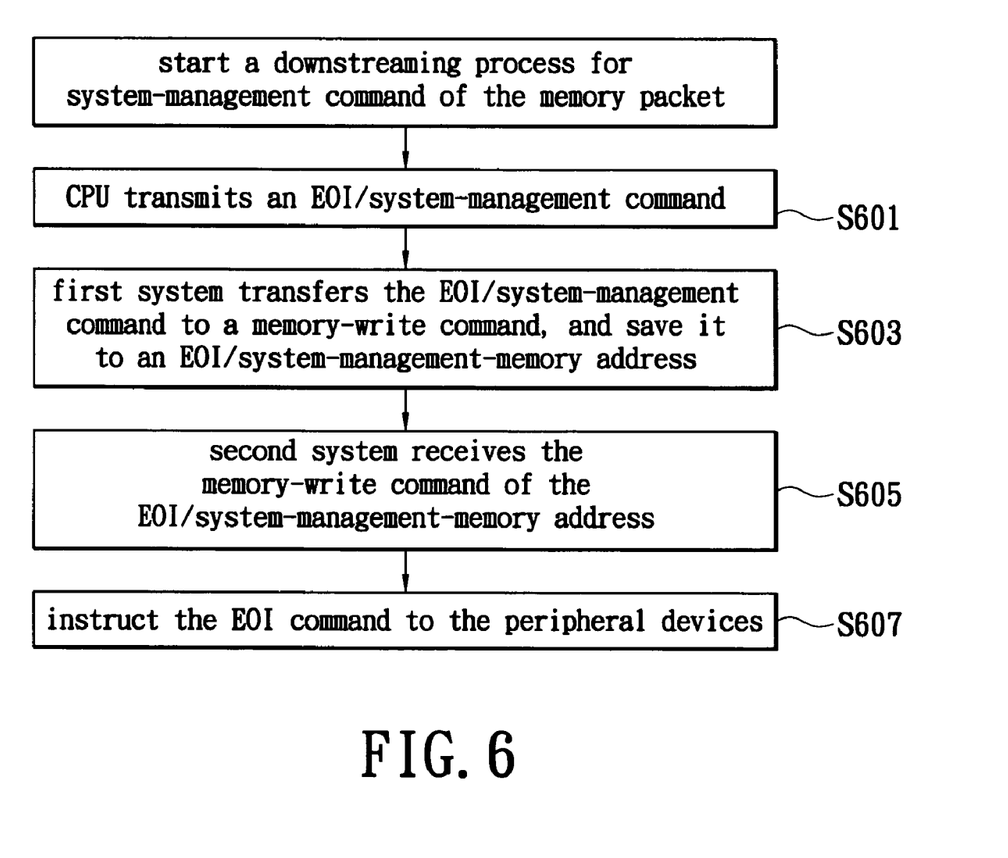
FIG. 6 is a flowchart for downstreaming an INTR/system-management command in a memory packet of the present invention.

The upstreaming process in the memory packet mentioned above involves the second system chip transmitting the interrupt and system-management message to the first system chip. Furthermore, FIG. 6 shows a downstreaming process for transmitting an EOI (End of Interrupt)/system-management command to the second system chip after the process of transmitting the INTR/system-management command shown in FIG. 5.

To begin the process, the CPU transmits the EOI/system-management command to the first system chip (step S601). Then the first system chip transfers the EOI/system-management command to a memory-write command, and saves a defined EOI/system-management-memory address in the memory packet (step S603).

After that, the second system chip receives the memory-write command transferred from the EOI/system-management command in the EOI/system-management-memory address (step S605). Finally, the second system chip notifies the peripheral devices of the End-of-Interrupt command, that is, a driving program thereof processes the EOI/system-management command (step S607).

The above-mentioned processes of the present invention implement the method for command transmission between systems. FIG. 4 illustrates the process of the INTA command transmission, FIG. 5 shows the flowchart of the upstreaming process of the system-management command. Meanwhile, FIG. 6 depicts the process for downstreaming the system-management command.

Figure 7:
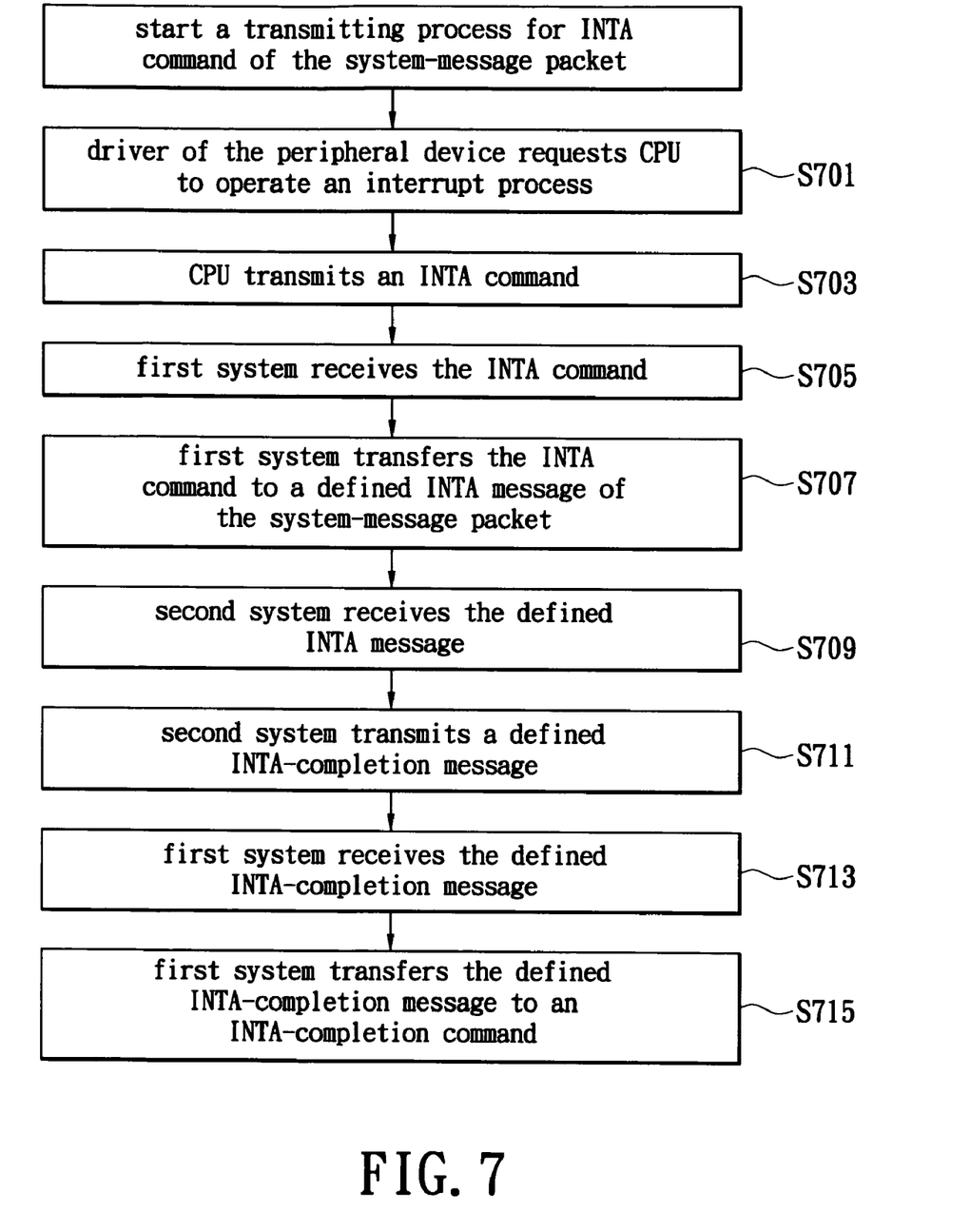
FIG. 7 is a flowchart for transmitting an INTR/system-management command in a system message packet of the present invention.

Furthermore, the defined address utilized to transmit the interrupt, the INTA command, and the system-management command in the system message packet depicted in FIG. 2B are different from the transmission with the memory packet. FIG. 7 shows the preferred embodiment of the present invention illustrating the method for command transmission between systems, which transfers a plurality of commands between system chips through the address defined in the system message packet carried via the PCI Express bus within the computer system.

To transmit an INTA command, a driving program of the peripheral device requests the CPU to operate an interrupt process (step S701), and the CPU transmits the INTA command to the first system chip (step S703).

Next, the first system chip, such as the North Bridge chip, receives the INTA command (step S705), and then transfers the INTA command to an INTA message defined in the system message packet (step S707).

Afterward, the second system chip receives the defined INTA message from the first system chip (step S709), and responds with a defined INTA-completion message to the first system chip notifying the first system chip of the defined INTA-completion message (step S711).

The first system chip receives the defined INTA-completion message (step S713) and transfers the defined INTA-completion message to an INTA-completion command (step S715).

Figure 8:
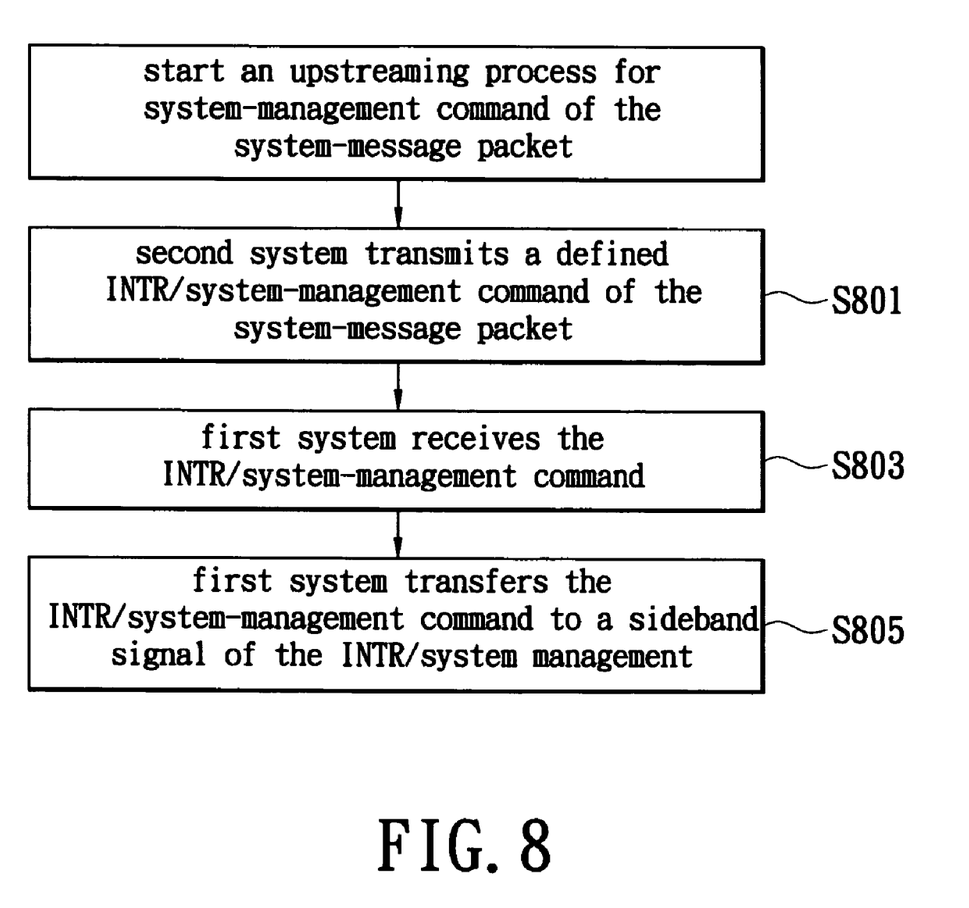
FIG. 8 is a flowchart for upstreaming an INTR/system-management command in a system message packet of the present invention.

After the transmission of the INTA command shown in FIG. 7, the INTR/system-management command upstreamed from the second system chip to the first system chip shown in FIG. 8 starts.

To begin the process, the second system chip, such as the South Bridge chip, transmits a defined INTR/system-management command in a certain address defined in the system message packet (step S801) to the first system chip. Next, the first system chip receives the defined INTR/system-management command (step S803), and transfers the defined INTR/system-management command to a sideband signal of the INTR/system management (step S805).

Figure 9:
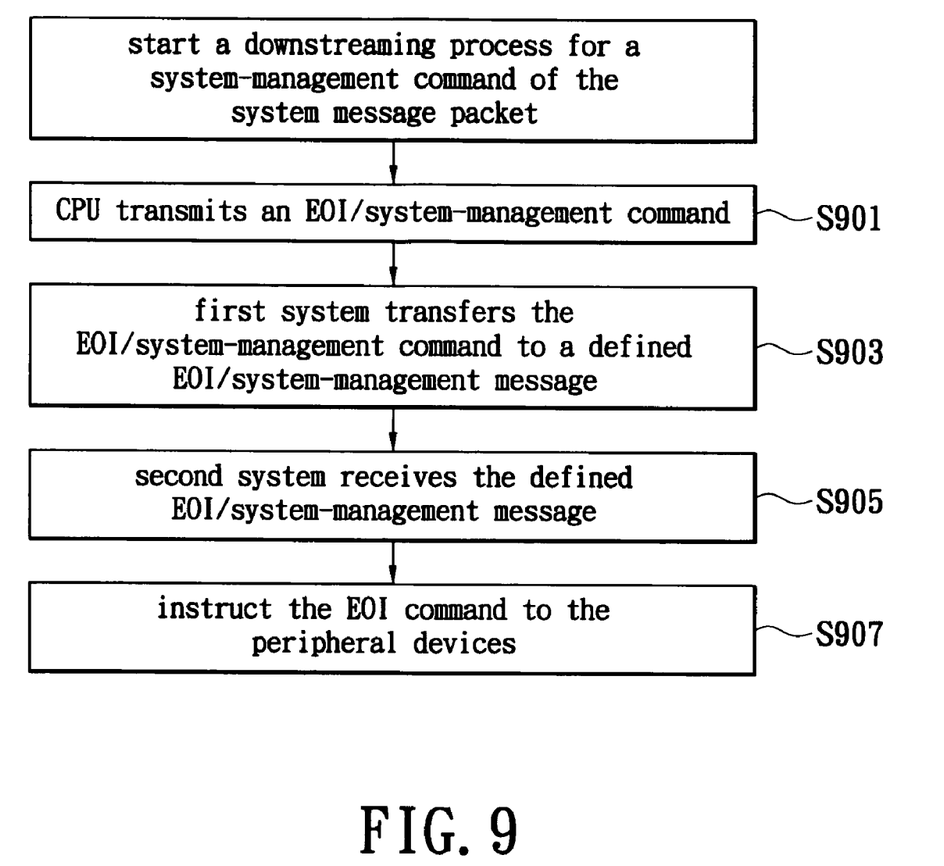
FIG. 9 is a flowchart for downstreaming an INTR/system-management command in a system message packet of the present invention.

Then the downstreaming process of an EOI/system-management command transmitted from the first system chip to the second system chip shown in FIG. 9 starts.

The CPU transmits the EOI/system-management command in a certain address of the system message packet (step S901). Then, the first system chip, such as the North Bridge, transfers the EOI/system-management command to an EOI/system-management message in the certain address of the system message packet (step S903).

Afterward, the second system chip receives the defined EOI/system-management message (step S905). Finally, the second system chip notifies the End-of-Interrupt command to the related peripheral device, namely, the driving program of the peripheral device processes the EOI/system-management command (step S907).

From the above-mentioned processes illustrating the method for command transmission between systems, FIG. 4 to FIG. 6 and FIG. 7 to FIG. 9 respectively disclose the transmitting processes of the interrupt or system-management command using the PCI Express standard. Both the certain address defined in the memory packet and another certain address defined in the system message packet are used to transmit the interrupt or the system-management command. The command transmission between systems can be the signal transmission between the North Bridge chip and the South Bridge chip, or between the CPU and system chips, or between the controllers controlling the peripheral devices.

The many features and advantages of the present invention are apparent from the written description above and it is intended by the appended claims to cover all. Furthermore, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for transmitting a communication signal from a first system chip to a second system chip using a bus protocol that is not designed for communication between system chips, the method comprising:
   receiving the communication signal from a CPU;
   constructing a data packet complying with the bus protocol, wherein the data packet comprises a memory address field, and wherein the data packet is a memory read request packet complying with the bus protocol;
   inserting the communication signal into the memory address field; and
   transmitting the data packet to the second system chip, wherein the second system chip extracts the communication signal from the memory address field of the data packet.

2. The method of claim 1, wherein the bus protocol conforms to the PCI-Express standard.

3. The method of claim 1, wherein the first system chip is a north-bridge chip and the second system chip is a south-bridge chip.

4. The method of claim 1, wherein the communication signal is an interrupt acknowledgement signal.

5. The method of claim 4, wherein the data packet is a system message packet complying with the bus protocol.

6. The method of claim 1, wherein the communication signal is an end-of-interrupt signal.

7. The method of claim 1, wherein the communication signal corresponds to a system management command between system chips.

8. A method for transmitting a communication signal from a first system chip to a second system chip using a bus protocol that is not designed for communication between system chips, the method comprising:
   receiving the communication signal for communication to a CPU;
   constructing a data packet comprising a memory address field, wherein the data packet is a memory write request packet complying with the bus protocol;
   inserting the communication signal into the memory address field; and
   transmitting the data packet to the second system chip, wherein the second system chip extracts the communication signal from the memory address field of the data packet.

9. The method of claim 8, wherein the bus protocol conforms to the PCI-Express standard.

10. The method of claim 8, wherein the first system chip is a south-bridge chip and the second system chip is a north-bridge chip.

11. The method of claim 8, wherein the communication signal is an interrupt signal.

12. The method of claim 11, wherein the data packet is a system message packet complying with the bus protocol.

13. The method of claim 8, wherein the communication signal corresponds to a system management command between system chips.

* * * * *